US011645185B2

(12) United States Patent
Elbaum et al.

(10) Patent No.: US 11,645,185 B2
(45) Date of Patent: May 9, 2023

(54) DETECTION OF FAULTS IN PERFORMANCE OF MICRO INSTRUCTIONS

(71) Applicant: Intel Corporation, Santa Clara, CA (US)

(72) Inventors: Reuven Elbaum, Haifa (IL); Chaim Shen-Orr, Haifa (IL); Assaf Admoni, Herzliya (IL)

(73) Assignee: INTEL CORPORATION, Santa Clara, CA (US)

( * ) Notice: Subject to any disclaimer, the term of this patent is extended or adjusted under 35 U.S.C. 154(b) by 119 days.

(21) Appl. No.: 17/033,272

(22) Filed: Sep. 25, 2020

(65) Prior Publication Data

US 2022/0100629 A1 Mar. 31, 2022

(51) Int. Cl.
| | | |
|---|---|---|
| *G06F 11/00* | (2006.01) | |
| *G06F 11/34* | (2006.01) | |
| *G06F 11/07* | (2006.01) | |
| *G06F 9/48* | (2006.01) | |
| *G06F 9/38* | (2018.01) | |
| *G06F 11/32* | (2006.01) | |

(52) U.S. Cl.
CPC ........ *G06F 11/3409* (2013.01); *G06F 9/3836* (2013.01); *G06F 9/4868* (2013.01); *G06F 11/0772* (2013.01); *G06F 11/327* (2013.01)

(58) Field of Classification Search
CPC ............. G06F 11/1629; G06F 11/1683; G06F 11/184; G06F 11/186; G06F 11/277; G06F 11/327; G06F 11/3409; G06F 11/0772

See application file for complete search history.

(56) References Cited

U.S. PATENT DOCUMENTS

| | | | | |
|---|---|---|---|---|
| 8,108,730 B2* | 1/2012 | Pathirane | ............ | G06F 11/3648 714/31 |
| 9,208,036 B2* | 12/2015 | Moyer | ................. | G06F 12/126 |
| 2005/0223178 A1* | 10/2005 | Garcia | ............... | G06F 11/3404 711/151 |
| 2006/0107117 A1* | 5/2006 | Michaelis | ........... | G06F 11/1658 714/25 |
| 2006/0195849 A1* | 8/2006 | Peleska | ............... | G06F 11/1683 719/318 |
| 2007/0088979 A1* | 4/2007 | Pomaranski | ........ | G06F 11/1641 714/E11.061 |
| 2018/0121273 A1* | 5/2018 | Fortino | ............... | G06F 11/0751 |
| 2020/0174897 A1* | 6/2020 | McNamara | ......... | G06F 11/1629 |
| 2020/0348985 A1* | 11/2020 | O'Bleness | ............ | G06F 9/5038 |

\* cited by examiner

*Primary Examiner* — Elmira Mehrmanesh
(74) *Attorney, Agent, or Firm* — Jaffery Watson Mendonsa & Hamitlon LLP

(57) ABSTRACT

Micro-architectural fault detectors are described. An example of storage mediums includes instructions for receiving one or more micro instructions for scheduling in a processor, the processor including one or more processing resources; and performing fault detection in performance of the one or more micro instructions utilizing one or more of a first idle canary detection mode, wherein the first mode includes assigning at least one component as an idle canary detector to perform a canary process with an expected outcome, and a second micro-architectural redundancy execution mode, wherein the second mode includes replicating a first micro instruction to generate micro instructions for performance by a set of processing resources.

19 Claims, 9 Drawing Sheets

US 11,645,185 B2

DETECTION OF FAULTS IN PERFORMANCE OF MICRO INSTRUCTIONS

FIELD

This disclosure relates generally to data processing and more particularly to micro-architectural fault detectors.

BACKGROUND OF THE DISCLOSURE

In operation of a computing platform, current system and data security technology can often successfully protect an apparatus or system from numerous types of attacks in relation to micro-architectural operation.

However, fault attacks, such as attempts to induce faults through modification in voltage to a processor, modification in frequency of the processor, or applying electromagnetic or other kind of radiation on the processor's circuits, can compromise existing security technologies.

Previously these fault attacks were generally "out-of-scope" because fault injection requires physical access to the platform. However, it has been demonstrated that attackers can inject faults and cause silent data corruption by software attacks, thus increasing the urgency of addressing this potential hazard.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope.

DETAILED DESCRIPTION

Figure 1:
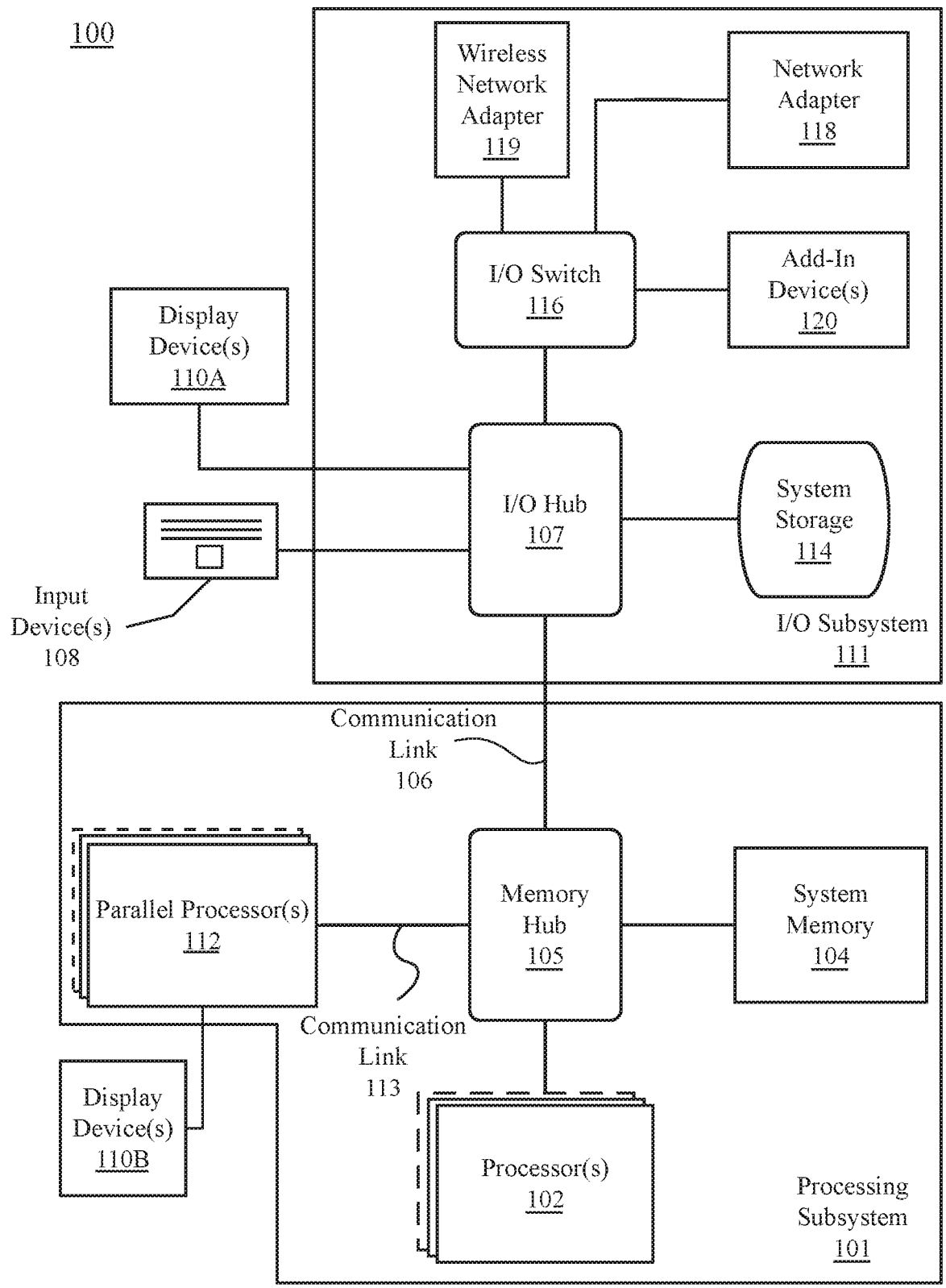
FIG. 1 is a block diagram illustrating a computer system configured to implement one or more aspects of the embodiments described herein.

Embodiments relate to micro-architectural fault detectors in a computing platform.

In processor operations, micro instructions (which may also be referred to as micro-ops, or µops) are functional or atomic operations of a processor, which may include a general purpose processor, graphics processor, or other processing unit. The micro-ops represent low level instructions used to implement complex machine instructions. These may transfer data and perform arithmetic and logical operations on registers.

In modern processor design, current system and data security technology may successfully protect an apparatus or system from numerous types of attacks in relation to micro-architectural operation. However, it has been shown that it is possible for attackers to inject faults and cause silent data corruption. An example of such an attack may include, but is not limited to, the Plundervolt attack (CVE-2019-11157) in which a reduction in voltage is applied to induce predictable errors in secure enclave operations. For this reason, it is important for a computing system to detect and deter such attacks in order to continue operation and maintain data security.

The two main tools that are applied to mitigate fault attacks are detection and prevention. Detection may be implemented by detectors, whereby dedicated detectors are provided to detect abnormal or out-of-spec conditions; and redundancy, whereby non-identical results are detected when a same execution is performed multiple times.

However, detection of a potential fault situation of this type may be difficult. Implementations of out-of-spec detection schemes are generally complex and inefficient in operation. Detectors that are implemented require proper safety margins so that triggering of false alarms is minimized, while harmful conditions are still reliably detected. However, the higher the safety margin is, the more likely it is that the detection system will degrade the performance of the computing platform.

Further, redundancy in the protection means may be needed because of redundant instances of the protected functionality. The cost of hardware redundancy is usually high, while redundant repetitions of code over time may only provide limited protection because the same fault can be induced to all repetitions. In redundant code, the cost is not only in execution time, but also in the cost in in writing custom code.

In some embodiments, an apparatus, system, or process is to provide micro-architectural fault detection for a computing platform. In some embodiments, one or both of the following protection technologies may be implemented in an apparatus, system, or process to provide fault detection:

(1) Idle Canary Detection Mode—In an idle canary detection technology, one or more idle processing resources (such as idle execution units, streaming processor elements, or other elements) are converted into (i.e., are assigned to operate as) canary detectors to perform canary operations having expected results. Upon actual results of the canary operations failing to match the expected, a possible fault is detected, and. one or more actions may be taken in response to the possible detection of a fault, such as issuing a fault alert.

(2) Micro-Architectural Redundancy Execution Mode—During a micro-architectural redundancy execution mode, micro-ops are replicated and issued multiple times, which may include issuance to different processing resources or to different execution ports. The results of the replicated micro-ops are then verified, with the handling of the micro-op result being determined based on the verification operation. In an example, upon determining that that all results of the replicated micro-ops do not match, a possible fault is detected, and one or more actions may be taken in response to the possible detection of a fault, such as preventing the micro-op from retiring. Alternatively, a result reached by a majority of the replicated micro-ops may be selected as a result of the micro-op.

In some embodiments, both such protection technologies are tunable, the technologies to be dynamically tuned and configured, and may be switched on/off on demand by software, firmware, or hardware.

System Overview

FIG. 1 is a block diagram illustrating a computing system 100 configured to implement one or more aspects of the embodiments described herein. The computing system 100 includes a processing subsystem 101 having one or more processor(s) 102 and a system memory 104 communicating via an interconnection path that may include a memory hub 105. The memory hub 105 may be a separate component within a chipset component or may be integrated within the one or more processor(s) 102. The memory hub 105 couples with an I/O subsystem 111 via a communication link 106. The I/O subsystem 111 includes an I/O hub 107 that can enable the computing system 100 to receive input from one or more input device(s) 108. Additionally, the I/O hub 107 can enable a display controller, which may be included in the one or more processor(s) 102, to provide outputs to one or more display device(s) 110A. In one embodiment the one or more display device(s) 110A coupled with the I/O hub 107 can include a local, internal, or embedded display device.

The processing subsystem 101, for example, includes one or more parallel processor(s) 112 coupled to memory hub 105 via a bus or other communication link 113. The communication link 113 may be one of any number of standards-based communication link technologies or protocols, such as, but not limited to PCI Express, or may be a vendor specific communications interface or communications fabric. The one or more parallel processor(s) 112 may form a computationally focused parallel or vector processing system that can include a large number of processing cores and/or processing clusters, such as a many integrated core (MIC) processor. For example, the one or more parallel processor(s) 112 form a graphics processing subsystem that can output pixels to one of the one or more display device(s) 110A coupled via the I/O Hub 107. The one or more parallel processor(s) 112 can also include a display controller and display interface (not shown) to enable a direct connection to one or more display device(s) 110B.

Within the I/O subsystem 111, a system storage unit 114 can connect to the I/O hub 107 to provide a storage mechanism for the computing system 100. An I/O switch 116 can be used to provide an interface mechanism to enable connections between the I/O hub 107 and other components, such as a network adapter 118 and/or wireless network adapter 119 that may be integrated into the platform, and various other devices that can be added via one or more add-in device(s) 120. The add-in device(s) 120 may also include, for example, one or more external graphics processor devices and/or compute accelerators. The network adapter 118 can be an Ethernet adapter or another wired network adapter. The wireless network adapter 119 can include one or more of a Wi-Fi, Bluetooth, near field communication (NFC), or other network device that includes one or more wireless radios.

The computing system 100 can include other components not explicitly shown, including USB or other port connections, optical storage drives, video capture devices, and the like, may also be connected to the I/O hub 107. Communication paths interconnecting the various components in FIG. 1 may be implemented using any suitable protocols, such as PCI (Peripheral Component Interconnect) based protocols (e.g., PCI-Express), or any other bus or point-to-point communication interfaces and/or protocol(s), such as the NVLink high-speed interconnect, or interconnect protocols known in the art.

The one or more parallel processor(s) 112 may incorporate circuitry optimized for graphics and video processing, including, for example, video output circuitry, and constitutes a graphics processing unit (GPU). Alternatively or additionally, the one or more parallel processor(s) 112 can incorporate circuitry optimized for general purpose processing, while preserving the underlying computational architecture, described in greater detail herein. Components of the computing system 100 may be integrated with one or more other system elements on a single integrated circuit. For example, the one or more parallel processor(s) 112, memory hub 105, processor(s) 102, and I/O hub 107 can be integrated into a system on chip (SoC) integrated circuit. Alternatively, the components of the computing system 100 can be integrated into a single package to form a system in package (SIP) configuration. In one embodiment at least a portion of the components of the computing system 100 can be integrated into a multi-chip module (MCM), which can be interconnected with other multi-chip modules into a modular computing system.

It will be appreciated that the computing system 100 shown herein is illustrative and that variations and modifications are possible. The connection topology, including the number and arrangement of bridges, the number of processor(s) 102, and the number of parallel processor(s) 112, may be modified as desired. For instance, system memory 104 can be connected to the processor(s) 102 directly rather than through a bridge, while other devices communicate with system memory 104 via the memory hub 105 and the processor(s) 102. In other alternative topologies, the parallel processor(s) 112 are connected to the I/O hub 107 or directly to one of the one or more processor(s) 102, rather than to the memory hub 105. In other embodiments, the I/O hub 107 and memory hub 105 may be integrated into a single chip. It is also possible that two or more sets of processor(s) 102 are attached via multiple sockets, which can couple with two or more instances of the parallel processor(s) 112.

Some of the particular components shown herein are optional and may not be included in all implementations of the computing system 100. For example, any number of add-in cards or peripherals may be supported, or some components may be eliminated. Furthermore, some architectures may use different terminology for components similar to those illustrated in FIG. 1. For example, the memory hub 105 may be referred to as a Northbridge in some architectures, while the I/O hub 107 may be referred to as a Southbridge.

Micro-Architectural Fault Detection

Figure 2:
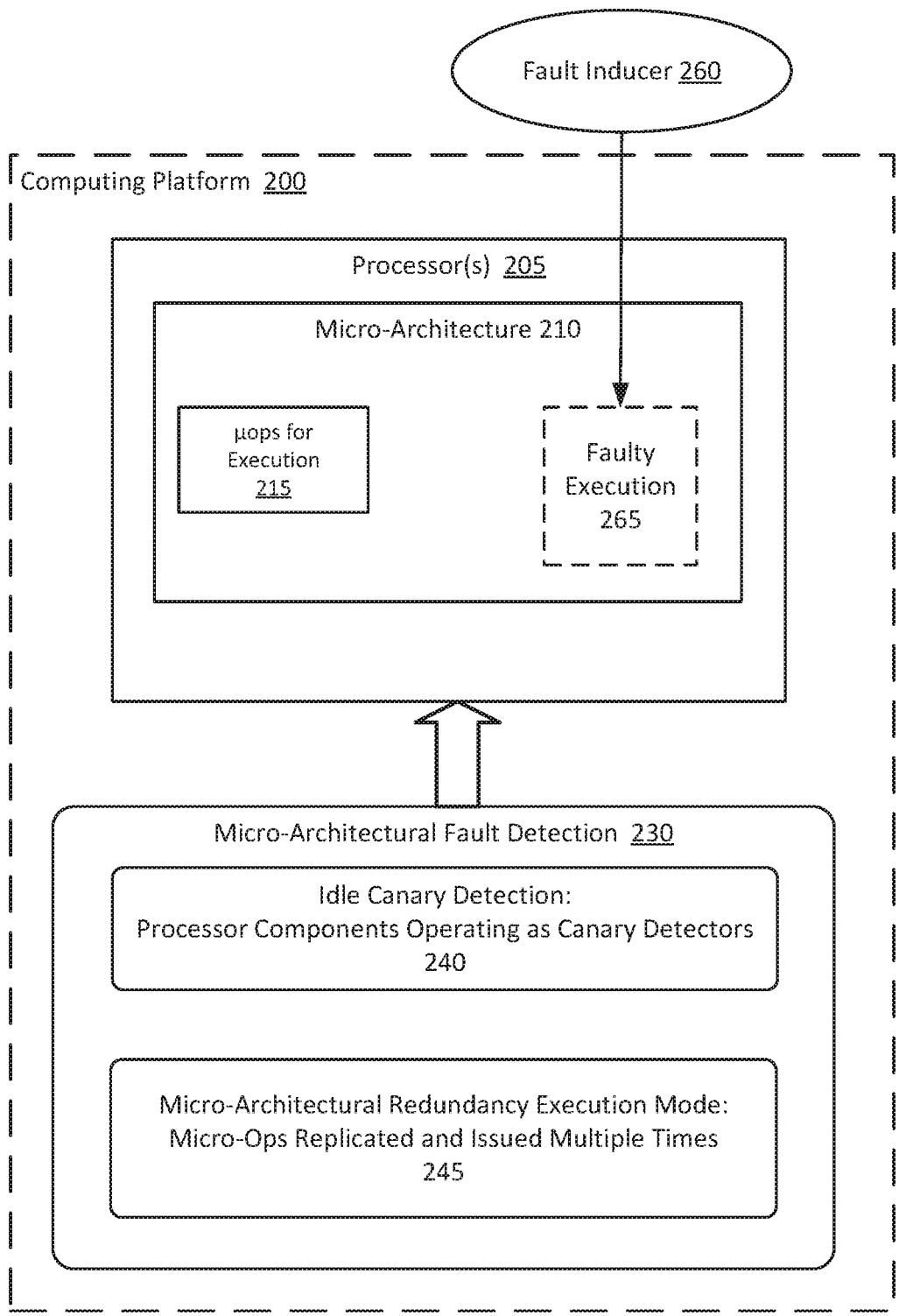
FIG. 2 is an illustration of micro-architectural fault detection in a computing platform, according to some embodiments.

FIG. 2 is an illustration of micro-architectural fault detection in a computing platform, according to some embodiments. A computing platform 200 may include one or more processors 205. Each processor includes one or more processing resources, As used herein "processing resource" refers to a processing element, including, for example, an execution unit (EU), execution resource, processing unit, processing engine, stream processor, streaming multiprocessor (SM), graphics multiprocessor, multi-core group, or compute unit.

Figure 4:
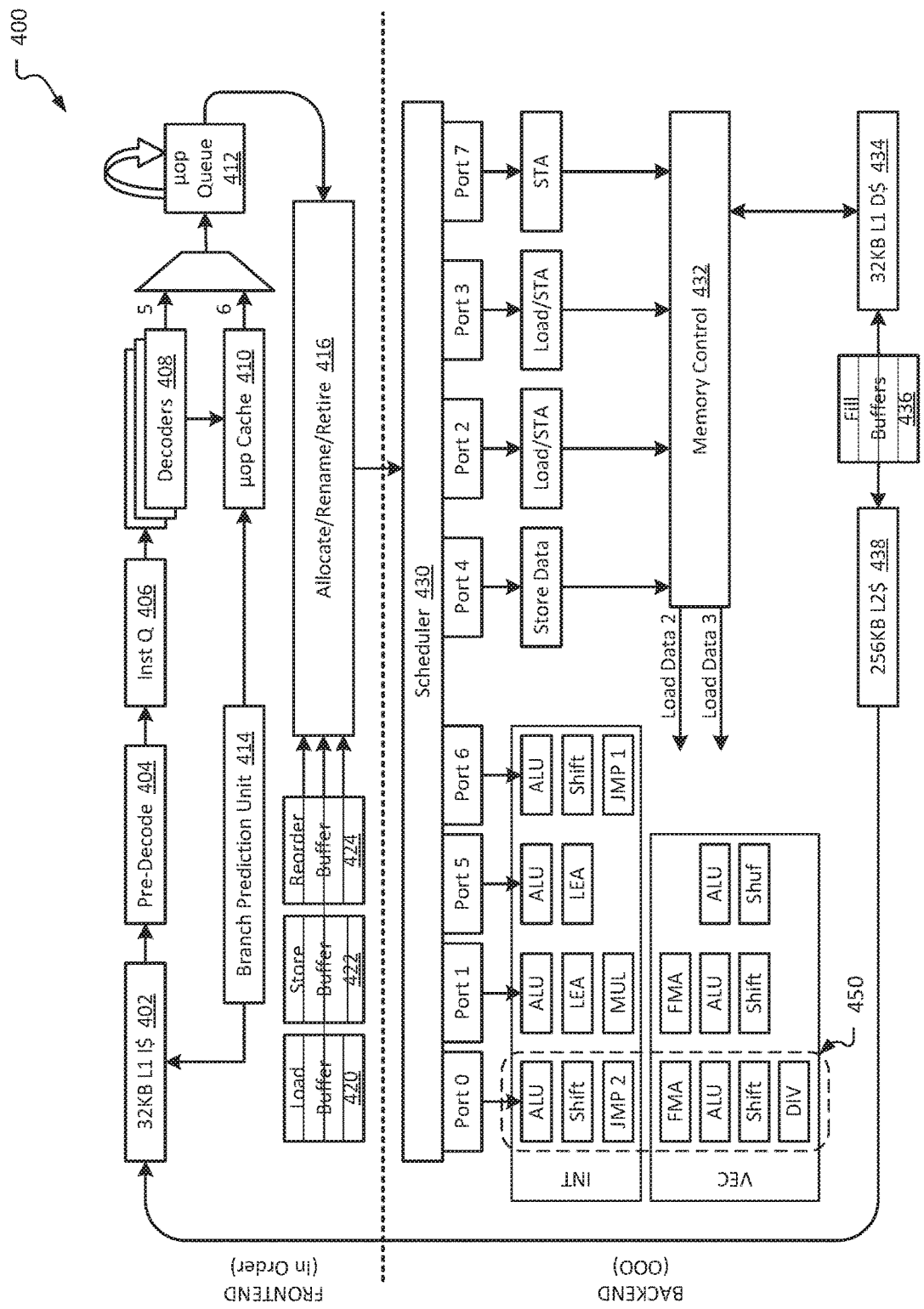
FIG. 4 is an illustration of idle canary micro-architectural fault detection in a computing platform, according to some embodiments.
Figure 7:
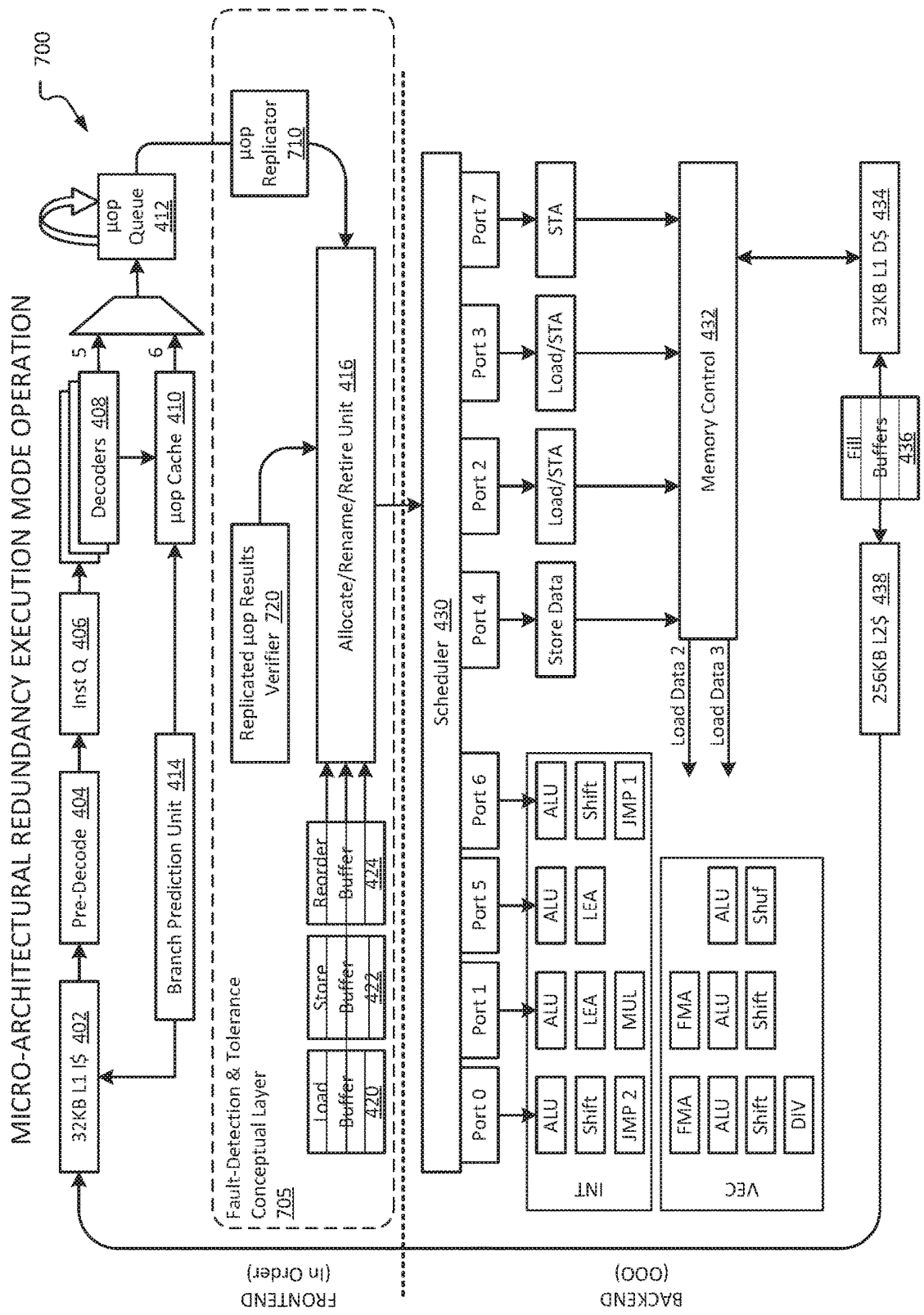
FIG. 7 is an illustration of micro-architectural redundancy execution in a computing platform, according to some embodiments.

The micro-architecture 210 of a processor 205 includes multiple components, such as further illustrated in the examples provided in FIGS. 4 and 7. In modern CPU architectures instructions are decoded into a stream of micro instruction (µops) 215 that are scheduled for execution on one of multiple execution ports, as further illustrated in FIGS. 4 and 7.

However, it is possible for one of the elements of the processor 205 to be attacked and provide a faulty execution 265. The fault may be induced by one or more fault inducers 260 including, but not limited to: modification in voltage to the processor; modification in frequency of the processor; applying laser light on the processor's circuits; applying electromagnetic or other kind of radiation on the processor's circuits; or operating other elements in the processor in a malicious way that affects the attacked element. As used in FIG. 2, the fault inducer 250 represents any potential means, process, or system by which an attacker can modify a correct calculation is a processor.

In some embodiments, one or both of the following micro-architectural fault detection technologies 230 may be implemented in an apparatus, system, or process to address fault attacks on the computing platform:

(1) Idle Canary Detection Mode 240—In an idle canary detection technology, one or more components that are temporarily idle (and thus are available for use), which may include, but is not limited to, processing resources (such as execution units, streaming processor elements, or other elements), are converted into canary detectors during their idle time for purposes of detecting possible fault conditions. For example, each execution port of a processor may contain multiple processing resources (such as execution units). However, only one of these processing resources is generally active at a time, with one micro-op starting execution at one processing unit and the remaining processing resources not starting execution, i.e., being in idle execution state.

In an attack on a processor, a fault can be induced by a "voltage glitch" fault inducer 260 comprising a temporal alteration of the operating voltage. In the processor core, execution units of a same port are likely to be placed in adjustment in relation to each other, and to be powered by the same power supply network. When the power supply of one execution unit is glitched, the supplies of other execution units in the same execution port are most likely glitched as well. Therefore, detecting faults in one execution unit suggests that other execution units may be affected as well.

In some embodiments, in the idle canary detection mode 240 one or more processor components, such as processing resources, are assigned as canary detectors to execute a predefined operation with expected results, where an expected result is any result that can later be verified. An expected result, for example, be verified against expected values, behavior, logical or algorithmic rules, or any other result verification method. In one example, a particular processing resource is to perform a simple operation for which a particular result should be produced. However, the affected result may be affected by a fault, such as a reduced voltage, that is applied to the processor. The processor is then to verify the actual results generated by the processing resources against the expected results. In some embodiments, the processor is then to take appropriate action, such as is to generate an alert when there is a difference between the actual and expected results.

Figure 3:
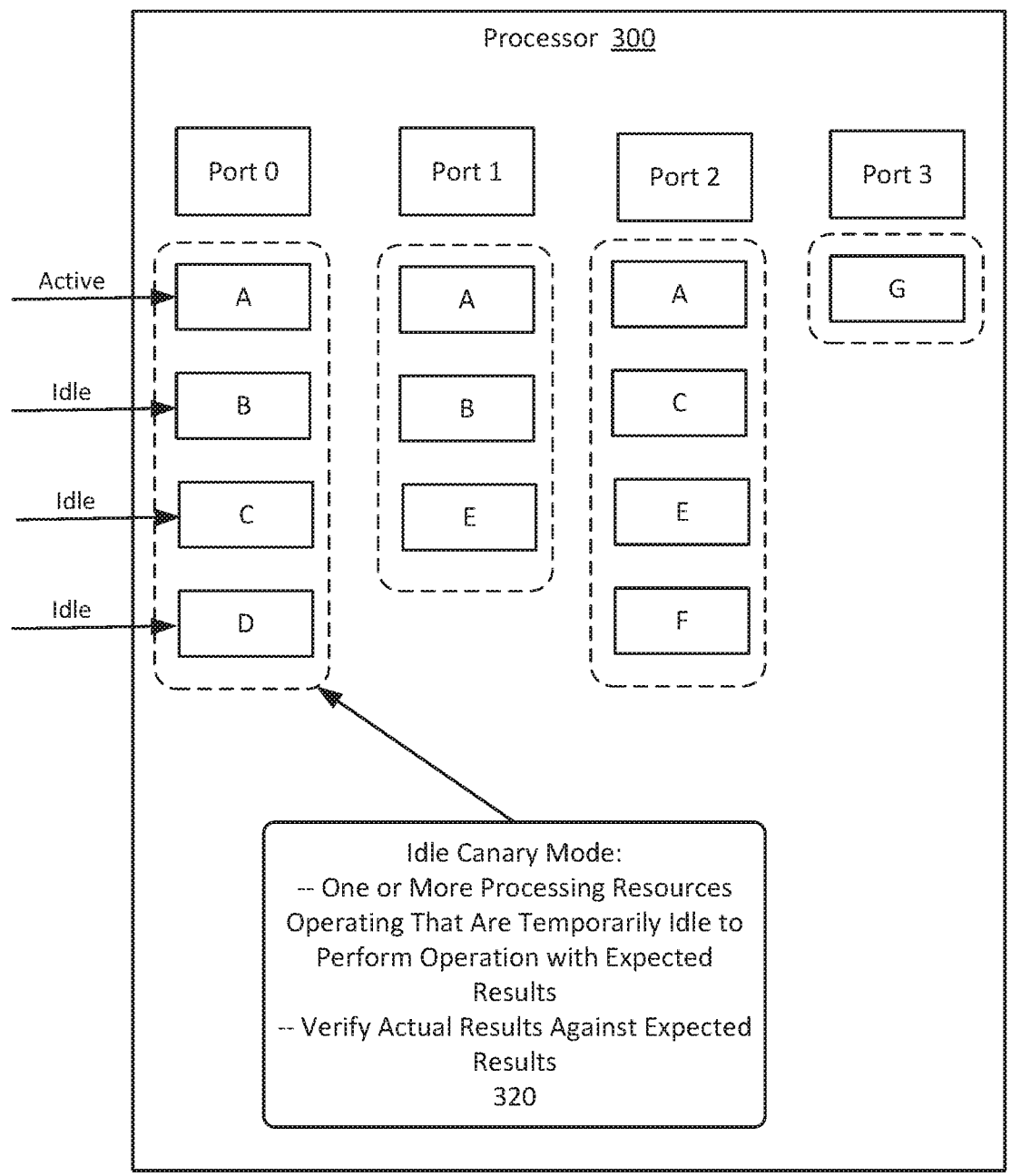
FIG. 3 is an illustration of idle canary fault detection in a processor, according to some embodiments.
Figure 5:
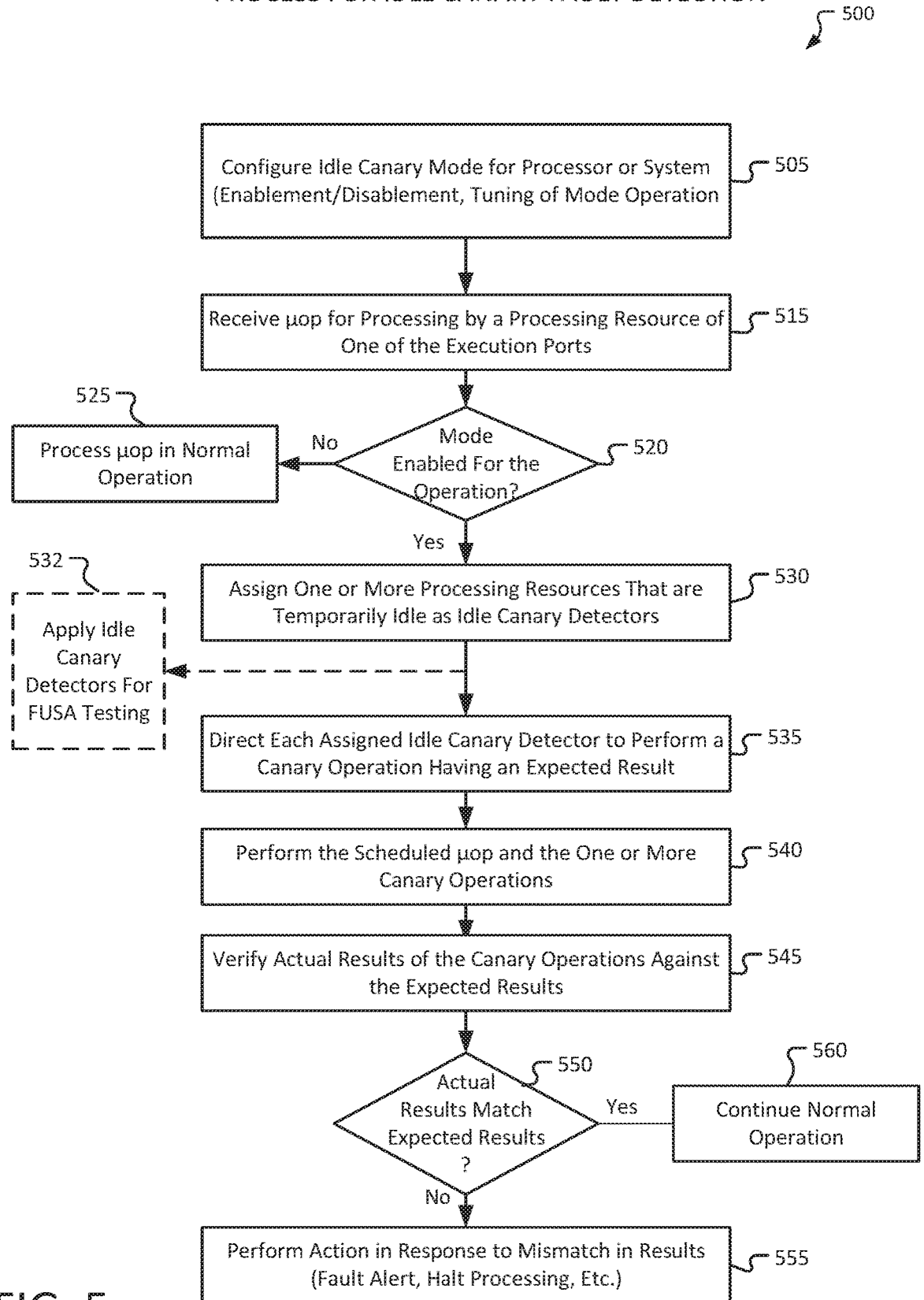
FIG. 5 is a flowchart to illustrate a process for an idle canary mode for detection of fault injection into a processor, according to some embodiments.

The idle canary detection technology may be as further illustrated in FIGS. 3, 4, and 5.

(2) Micro-Architectural Redundancy Execution Mode 245—In modern CPU architectures instructions are decoded into a stream of micro instructions (micro-ops or µops) that are scheduled for execution on one of the execution ports. During a micro-architectural redundancy execution mode, a micro instruction is replicated and issued multiple times, which may include issuance to different execution ports, and such µop is committed only if all redundant execution results are identical.

Figure 6:
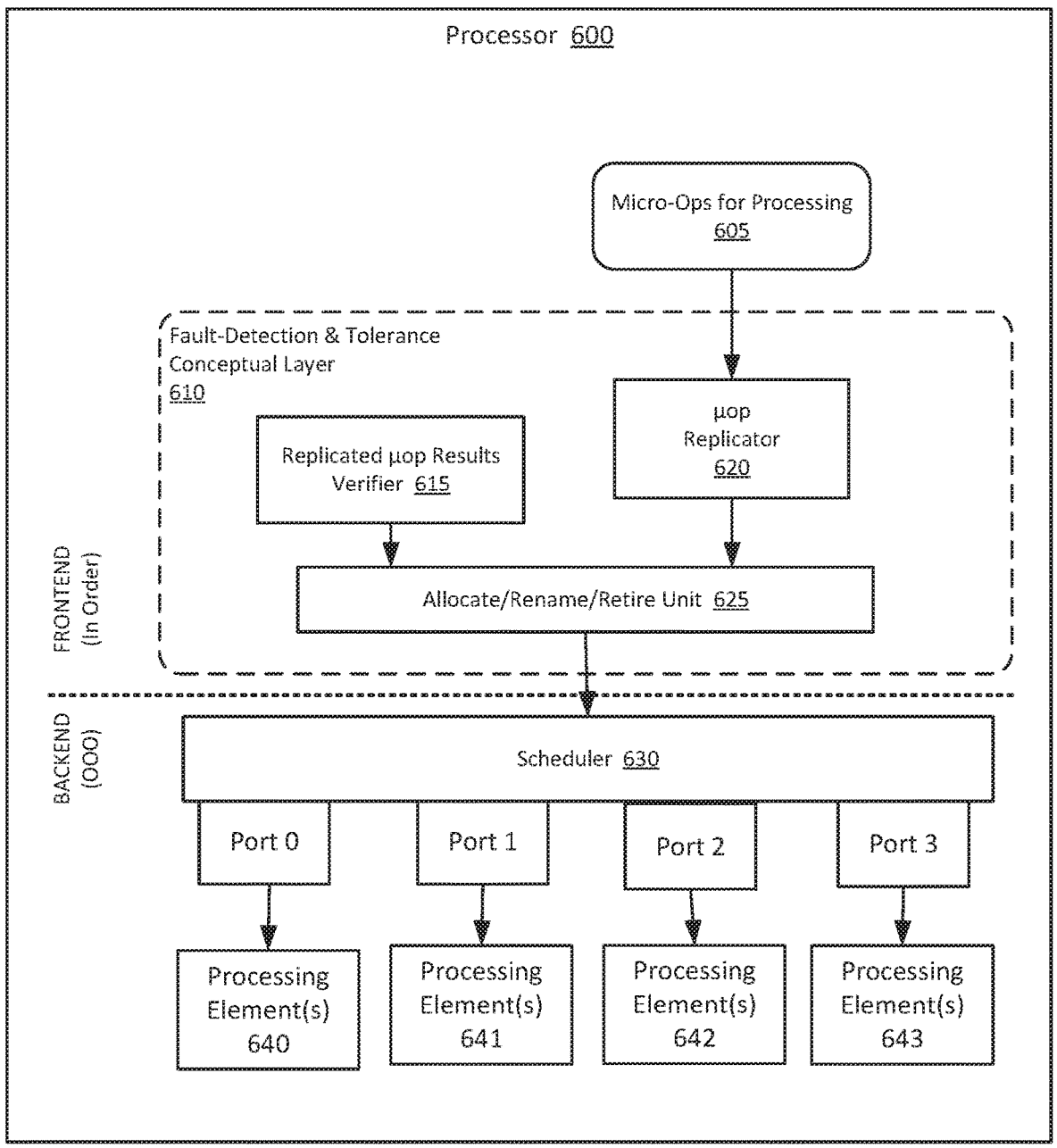
FIG. 6 is an illustration of micro-architectural redundancy execution for detection of faults in a processor, according to some embodiments.

The micro-architectural redundancy execution mode technology may be as further illustrated in FIGS. 5, 6, and 7.

In some embodiments, both such micro-architectural fault detection technologies 240 and 245 are tunable such that the technologies may dynamically tuned and configured as required, and may be switched on/off on demand by software, firmware, or hardware.

Idle Canary Fault Detection:

FIG. 3 is an illustration of idle canary fault detection in a processor, according to some embodiments. As illustrated in FIG. 3, a processor 300 may, for example, include multiple execution ports, shown as Port 0, Port 1, Port 2, and Port 3. Each execution port may contain one or more processing resources (such as execution units or other elements), wherein each processing resource may provide a different processing function. An example providing further detail regarding micro operation processing is illustrated in FIG. 4.

In the example provided in FIG. 3, each execution port may include the same or different processing resource, depending on the particular embodiment. As an example, Port 0 is illustrated with processing resources A, B, C, and D; Port 1 with processing resources A, B, and E; Port 2 with processing resources A, C, E, and F; and Port 3 with processing resource G.

In the operation of, for example, Port 0, there are four processing resources that may be capable of processing µops. Each of the processing resources may be, for example, processing resources to perform one of an ALU (Arithmetic Logic Unit), a Shift unit, a JMP (Jump) unit, a Division (DIV) unit, or other such unit. However, in general only one of these processing resources is active at a time, with the other processing resources being temporarily idle. In the illustrated example of FIG. 8, processing resource A may be active for a particular micro-op, while processing resources B, C, and D are temporarily idle for purposes of such operation.

In some embodiments, upon activating an idle canary detection mode, one or more of processing resources B, C, and D, which are temporarily idle, are converted to idle canary operation during their idle time, and thus are to perform one or more micro operations with expected results during the active operation of processing resource A. This may be referred to as a canary operation, which may be defined as an executed operation, the input data for the operation, and the expected result for the operation.

In some embodiments, canary operations may be chosen in advance to optimize fault detection probability. For example, canary operations may be selected to g exercise the most critical timing paths or to exhaust other critical design parameters. Further, more than one canary operation can be predefined per execution unit. Canary operation operations can be, for example, either hardcoded inside the design of an execution unit, written into a register as a part of the execution unit configuration, or otherwise be made available in design or configuration such that the canary operation can be executed when needed.

In some embodiments, the actual outcome of the canary operation performed by each processing resource is then verified against the expected outcome for the canary operation. Upon determining that the actual results match the expected results for each of the idle canary detectors, the processor then may proceed with normal operations utilizing the results generated by the active processing resource.

Upon determining that the actual results do not match the expected results for each of the idle canary detectors, the processor is then to take appropriate action, such as to generate an alert.

Idle canary detectors may be utilized to provide effective protection against fault injection attacks without the need for sophisticated and expensive customized fault detectors. The reuse of existing logical gates that are temporarily idle eliminates the need for redundant detection circuits as the existing gates operate as the detectors in the idle canary mode. Further, idle canary detectors may be implemented into current processor microarchitecture, with the changes required to implement the technology being primarily in the core's frontend (as further illustrated in FIG. 4). Converting processing resources into canary detectors can be accomplished without requiring major architectural changes to the processor. In particular, there is no need for additional processing resources (such as additional execution units). In some embodiments, idle canary detectors reuse existing logical gates inside processing resources, and therefore do not cause a significant performance degradation. Further, there is no performance degradation when the mode is switched off as each processing resource then provides normal operation.

There are generally multiple idle execution units for each port. In some embodiments, all of the units that are temporarily idle may be configured to serve as idle canary detectors simultaneously. However, such configuration may potentially lead to power and heating problems. Such problem, if it exists, can be prevented through coordination. such as by arbitration of the idle canary detection mode between available units.

In some embodiments, detection sensitivity for a canary operation may depend on the specific canary operation. Canary operation can protect operations that are less sensitive than the canary operation itself. In some embodiments, canary operation may be designed to be as sensitive as possible. When canary operations are the most sensitive operations in the execution port, they may be used to protect any operation in the execution port. In other embodiments, less sensitive canary operation may be preferable to reduce false alerts.

In some embodiments, the idle canary detector concept may further utilize processing resource idle time for correct functionality verification. For example, the idle canary detector mode may be utilized for a functional safety (FUSA) testing system, which require that gates be tested in the processor unit. More specifically, the idle canary detection mode may be applied to reduce periodic testing time by enabling partial FUSA testing utilizing the idle canary operations during active operation of other processing resources, and thus allowing the system to skip part of the normal testing process if this has already been addressed by idle canary operations during their idle time.

In a certain embodiment, canary operations may be initiated by the port control logic. In such embodiment, the port will issue a micro-op to one of its execution units, and in addition will issue canary operations to one or more other execution units. The scheduling may be based on both capability of a canary operation to protect operation of an execution unit, and on the thermal/power cost in operation. The following example describes a particular canary operation scheduling technique that may be applied by an apparatus or system:

(a) During a canary tuning phase (which may be a canary design phase) all available canary operations are evaluated, and a list of all execution units that can be protected by each specific canary operation is recorded. In some embodiments, the expected power consumption caused by each canary operation is recorded as well.

(b) In addition, during run-time, the thermal status of each execution unit is dynamically maintained, indicating which execution units are thermally available for canary operation execution.

(c) When a micro-op is scheduled to one of a port's execution units, the most power-efficient canary operation that fulfils both of following conditions may be selected and scheduled to an idle execution unit:

(1) The canary operation is capable of protecting the micro-op's execution unit.

(2) The canary operation execution unit is thermally available under the current operating conditions.

FIG. 4 is an illustration of idle canary micro-architectural fault detection in a computing platform, according to some embodiments. A processor 400 to provide micro-architectural fault detection utilizing idle canary technology is illustrated. As illustrated, the microarchitecture of the processor 400 includes a frontend in which μops are processed in order, and a backend in which the μops may be performed out of order (OOO).

A illustrated in FIG. 4, in the frontend of the processor 400, a micro-op queue 412 receives micro-ops from decoders 408 (via L1 instruction cache 402, pre-decode 404, and instruction queue 406) and a micro-op cache 410. As further illustrated, the L1 instruction cache 402 receives data from an L2 cache 438, which is coupled with fill buffers 436, which is further coupled with an L1 data cache 434. The L1 instruction cache 402 and micro-op cache 410 are coupled with a branch prediction unit 414, which operates to predict or guess which branch will be taken in processing. The micro-ops from the micro-op queue 412 are provided for operations to allocate, rename, or retire 416. Also shown are the load buffer 420, store buffer, and reorder buffer 424. As further shown, fill buffers 436 provide data to L1 cache 438, coupled with L1 instruction cache 402, and L1 data cache 434, coupled with memory control 432.

Processed micro-operations are then received at a scheduler 430 for micro-op scheduling to a set of execution ports, shown as Port 0 through Port 7. In addition to certain ports (Ports 2, 3, 4, and 7 in this example) providing execution for memory control 432 (Store Date, Load/STA, or STA processing), a number of ports (Ports 0, 1, 5, and 6 in this example) include multiple execution units for either integer (INT) or vector (VEC) operation, wherein the execution units may include ALU (Arithmetic Logic Unit), Shift, JMP (Jump, as JMP 2 or JMP 1), FMA (Fused Multiple-Add), DIV (Division), LEA (Load Effective Address), or Shuf (Shuffle).

In some embodiments, the processor 400 includes an idle canary detection mode. Upon enabling the idle canary detection mode, one or more of the ports that include multiple executions (Ports 0, 1, 5, and 6 in this example) may be converted to idle canary detectors for use in sensing fault injection into the execution ports. For example, Port 0 includes a set of execution units 450 for integer and vector micro-op s, specifically integer ALU, Shift, and JMP 2 execution units, and vector FMA, ALU, Shift, and DIV execution units. Upon enablement of the idle canary detection mode, during operation one of the execution units (the active unit) to process a micro-op, one or more of the remaining execution units, which are temporarily idle, are converted to canary detectors to perform a canary operation during their idle time. Upon completion of the canary operations, the actual results are verified against the expected results to determine whether there is a possibility of fault condition. Upon one or more actual results being found to mismatch the respective expected result, one or more actions may be taken, such as providing a fault alarm.

In a specific example, when an integer ALU micro-op is issued to a port, such as Port 0, it will be executed on the INT ALU unit. All other execution units (integer: Shift, JMP 2, and all vector units) commence "idle" processing. At this time, one or more of such execution units, such as the Shift unit, may serve as idle canary detectors. In this mode, the Shift execution unit is configured to execute a canary operation (e.g., rotate-left) with a certain input (e.g., all-1's, '111111 . . . ') instead being idle. The canary operation actual result then can be verified against the expected result (which in this example is all-1's, '111111 . . . '). In case of mismatch, a canary fault alert may be raised.

As illustrated in FIG. 4, the existing execution units of the execution ports may be utilized to detect faults in an idle canary detection mode without the addition of separate detectors. In some embodiments, the idle canary detection mode is tunable, and may be configured and enabled or disabled dynamically. When the idle canary detection mode is switched on, an execution unit may consume more power in comparison to regular idle mode. However, this additional power is not consumed when the idle canary detection mode is switched off.

In some embodiments, the idle canary detection mode may be tunable to enable idle canary operation on certain execution units (or all available execution units) of the processor 400 as selected for the current conditions. For example, the mode may be disabled when highest performance is needed, and may be enabled in whole or part if there are high security concerns in operation. For example, the idle canary detection mode may include, but is not limited to, dynamic configuration (on demand) by software, firmware or hardware as follows:

(a) An MSR (Model Specific Register) interface or dedicated architectural instruction may be used for entering and exiting the mode. Software may take advantage of this execution mode to, for example, protecting fault sensitive critical sections, and may limit potential performance reduction during these sections only.

(b) Hardware or firmware may initiate the mode as a protective measure when required, such as during supply voltage or frequency changes.

It is noted that canary detection is not limited to an execution unit or other similar processing resource. In some embodiments, any other resource of a processor that is temporarily idle may be configured and utilized to serve as a canary detector. For example:

(a) If a vector-register-file is idle while the port's vector-ALU execution unit is idle, then a canary-operation that includes data transfer from the vector-register-file to the vector-ALU can be initiated.

(b) If a load/store unit is idle, then a canary-operation that includes data transfer to the store buffer (or from the load buffer) can be initiated.

(c) If a load buffer (store buffer) control is idle, then a canary-operation that includes data transfer from (or to) an L1 cache to the load buffer (or from the load buffer) can be initiated.

FIG. 5 is a flowchart to illustrate a process for an idle canary detection mode for detection of fault injection into a processor, according to some embodiments. In some embodiments, a process 500 includes configuring an idle canary detection mode for a particular processor or system 505, wherein a processor may, for example, include multiple execution ports, as illustrated in FIG. 3 and FIG. 4. Configuring the idle canary detection mode 505 may include, for example, enablement or disablement of the mode, or tuning operation of the mode for particular conditions.

The process may continue with processing of micro-operations for the processor 500. Upon receiving a micro-op for processing by a processing resource of one of the execution ports 515, such as receiving the micro-op from a micro-op queue, there may be a determination whether the idle canary detection mode is currently enabled for the operation 520, which may include enablement for the processor, enablement for a particular execution port, or other tuning of the mode. Micro-ops may be scheduled for multiple execution ports in parallel, and thus the illustrated process may be performed for the scheduling of each relevant micro-op. Upon determining that the mode is not enabled, the micro-op is processed in a normal operation 525.

If it is determined that the idle canary detection mode is enabled for the execution port 520, then one or more processing resources of the execution port that are temporarily idle (or one or more other components of the processor) are assigned as idle canary detectors 530. Each assigned idle canary detector is then directed to perform a canary operation having a certain expected result 535, the canary operation for a processing resource being an appropriate operation for the type of the relevant processing resource.

In some embodiments, the idle canary detector mode may be alternatively or additionally utilized for functional safety (FUSA) testing 532. More specifically, the idle canary detection mode may be applied to reduce periodic testing time by enabling partial FUSA testing utilizing the idle canary detectors during active operation of other processing resources, and thus allow the system to skip part of the normal testing process.

The scheduled micro-op and the one or more canary operations are then performed 540. Following completion of the one or more canary operations, the actual results of the canary operations are verified against the expected results for the canary operations 545. If the actual results match the expected results 550, then the process provides for continuing normal operation 560. If the actual results do not match the expected results, which may indicate detection of a fault, then an action may be performed in response to the mismatch in results 555. The action may, for example, include generation of a fault alert. In some embodiments, the process may proceed with, for example, halting processing operation or taking other security precautions if a certain number of fault alerts occur within a certain amount of time.

Micro-Architectural Redundancy Execution:

FIG. 6 is an illustration of micro-architectural redundancy execution for detection of faults in a processor, according to some embodiments. As illustrated in FIG. 6, a processor 600 includes a microarchitecture for processing of micro-ops, the processor core including a frontend and a backend, as illustrated in FIG. 6. In general the frontend is to feed the backend with a steady stream of decoded micro instructions (micro-ops). The backend then is the out-of-order execution part, which will schedule micro-ops for execution to multiple different execution ports, and, when all micro-ops dependencies are resolved, the micro-ops may be executed out-of-order. Finally, the executed micro-ops are retired in-order by the frontend committing their results.

In some embodiments, an apparatus or system includes a micro-architectural redundancy execution mode. During this mode, micro-ops are replicated and issued by the frontend multiple times. In some embodiments, the replicated micro-ops are then scheduled by the backend scheduler for execution on different execution ports.

In some embodiments, the results of the replicated micro-ops are then verified against each other to determine if all results match. Non-matching results generally will occur due to data corruption or other execution fault. In such a case, a possible fault is detected, and an action is taken in response to the detected fault. In some embodiments, during retirement, the micro-ops results are committed only if all of the multiple execution results are identical.

The backend may include a scheduler 630 to provide scheduling of micro-ops for the multiple execution ports, shown as Port 0, Port 1, Port 2, and Port 3. Each execution port may contain one or more processing resources (such as execution units or other elements), shown as processing resource(s) 640 for Port 0, processing resource(s) 641 for Port 1, processing resource(s) 642 for Port 2, and processing resource(s) 643 for Port 3. Each of the processing resources may be, for example, processing resources to perform one of an ALU (Arithmetic Logic Unit), a Shift unit, a JMP (Jump) unit, a Division (DIV) unit, or other such unit. An example providing further detail regarding micro operation processing is illustrated in FIG. 7.

In some embodiments, the processor includes a fault detection and tolerance conceptual layer 610 for use in addressing potential faults that may be directed to the processor 600. In some embodiments, the processor includes a micro-architectural redundancy execution mode, wherein, during such mode, micro-ops are replicated and issued multiple times. Such operation may include issuance of replicated micro-ops to the same or to different execution ports for performance.

In some embodiments, the decoded micro-ops for processing 605 are received at a micro instruction replicator (which may also be referred to as a micro-op replicator) 620. Upon determining that the micro-architectural redundancy execution mode is enabled, the micro-op replicator 620 is to replicate the micro-op one or more times for scheduling to execution ports that include a processing resource that is capable of processing the relevant micro-op. The scheduler 630 interacts with unit 625 for allocation and retirement of micro operations. The scheduler 630 is to schedule the original micro-op and one or more replicated micro-ops, with a separate result being obtained from the execution of each of them by each relevant processing resource (of the sets of processing resources 640-643) for the scheduled execution ports (of Port 0 through Port 3).

As with normal micro-op execution, the replicated micro-op execution needs to resolve dependencies and will require resources for operation. The fault detection and tolerance conceptual layer 610 will have an effect on activities such as resource allocation, register renaming, and micro-op retirement. However, this does not affect backend execution components.

In some embodiments, after processing the original micro-op and one or more replicated micro-ops, the results are verified by a replicated micro-op results verifier 615 to determine whether all of the results match, and to notify the allocate/rename/retire unit 625 regarding the outcome of the verification operation. The allocate/rename/retire unit 625 is then to take action based on the outcome of the verification operation. In some embodiments, the action includes committing the micro-op result only if all processing results (results for the original micro-op and one or more replicate micro-ops) match.

In some embodiments, when some micro-op processing results (results for the original micro-op and one or more replicate micro-ops) do not match, alternative or additional actions may be taken, such as one or more of the following:

(a) Halting the apparatus or system.

(b) Take a majority vote of the results of the original micro-op and one or more replicated micro-ops (such as when the micro-op is executed at least 3 times) as the result of the micro-op.

(c) Re-issue the failed micro-op multiple times (i.e., replicate the micro-op again) and schedule such additional micro-ops for repeated performance.

(d) Roll-back and start execution again from a saved unfaulty state.

(e) An adaptive scheme that allows operation without halting, and counts the number of detected faults. The apparatus or system will then halt when a number of detected faults exceed a certain threshold number, or a threshold number over a certain period of time.

(f) Providing a fault alert.

In some embodiments, the mode may be enabled or disabled, or may be tuned for current conditions or operations. Further, there is no performance degradation when the mode is switched off as each processing resource then provides normal operation.

In some embodiments, micro-architectural redundancy execution is operated in transactional mode. A transaction executes a code section using micro-architectural redundancy execution mode, where all transaction results are saved into a temporary memory and committed only if no fault was detected during transaction execution.

In some embodiments, an apparatus, system, or process may further provide for fault tolerance computation. There are cases in which faults are accidently induced during computation, corrupting their results. For example, cosmic rays may cause "Single Event Upset" (SEU) instances. In some embodiments, micro-architectural redundancy execution mode may be utilized to supply limited fault tolerance execution on one or more critical sections as required.

The micro-architectural redundancy execution mode can be initiated and terminated on demand by software, firmware or hardware, which may include, but is not limited to:

(a) An MSR (Model Specific Register) interface or dedicated architectural instruction may be used for entering and exiting the mode. Software may take advantage of this execution mode to, for example, protecting fault sensitive critical sections, and may limit potential performance reduction during these sections only.

(b) Hardware or firmware may initiate the mode as a protective measure when required, such as when detectors or other circuits indicate that out-of-spec conditions may occur, or as a preventive measure during voltage or frequency change or when high temperature is sensed.

When initiated by hardware or BIOS, the micro-architectural redundancy execution mode may affect the entire platform. However, when initiated by software, the effect of the mode may be limited to the current software domain. In an example, when two SMT (Simultaneous Multi-Threading) threads are used, the software in a first thread may run with the mode switched on, while the second thread may run with the mode switched off.

FIG. 7 is an illustration of micro-architectural redundancy execution in a computing platform, according to some embodiments. A processor 700 to provide micro-architectural fault detection utilizing micro-architectural redundancy technology is illustrated. As illustrated, the core of the processor 700 includes a frontend in which tops are processed in order, and a backend in which the μops may be performed out of order (OOO). Elements that are illustrated in FIG. 4 are indicated with same element numbers in FIG. 7.

In some embodiments, the processor includes a fault detection and tolerance conceptual layer 705 for use in addressing potential faults that may be directed to the processor 700. In some embodiments, the processor 700 includes a micro-architectural redundancy execution mode, wherein, during such mode, micro-ops are replicated and issued multiple times. Such operation may include issuance of replicated micro-ops to different execution ports, with the micro-ops thus to be processed multiple times.

In some embodiments, the micro-ops from the micro-ops queue 412 are received at a micro-op replicator 710. Upon determining that the micro-architectural redundancy execution mode is enabled, the micro-ops replicator 710 is to replicate the original micro-op one or more times for scheduling to one or more execution ports that include a processing resource that is capable of processing the relevant micro-op. The resulting micro-ops (the original micro-op and one or more replicated micro-ops) are then received by a unit 416 for direction to a scheduler 430. The scheduler 430 is then to schedule the original micro-op and one or more replicated micro-ops, with a separate result being obtained from the execution of each of them by each relevant processing resource. As illustrated, Ports 0, 1, 5, and 6 each include multiple execution units for either integer (INT) or vector (VEC) operation, wherein the execution units may include ALU (Arithmetic Logic Unit), Shift, JMP (Jump, as JMP 2 or JMP 1), FMA (Fused Multiple-Add), DIV (Division), LEA (Load Effective Address), or Shuf (Shuffle). In one example, a micro-op to be performed by an integer ALU, such as the integer ALU of Port 0, may be replicated one or more times to be scheduled for processing by the integer ALU execution units of one or more of Port 1, Port 5, or Port 6.

In some embodiments, after performing the original micro-op and one or more replicated micro-ops, the results are verified by a replicated micro-op results verifier 720 to determine whether all of the results match, and to notify the allocate/rename/retire unit 416 regarding the outcome of the verification operation. The allocate/rename/retire unit 416 is then to take action based on the outcome of the operation. In some embodiments, the action includes committing the micro-op result during retirement only if all processing results (results for the original micro-op and one or more replicated micro-ops) match. In some embodiments, when some micro-op processing results (results for the original micro-op and one or more replicate micro-ops) do not match alternative or additional actions may be taken.

Figure 8:
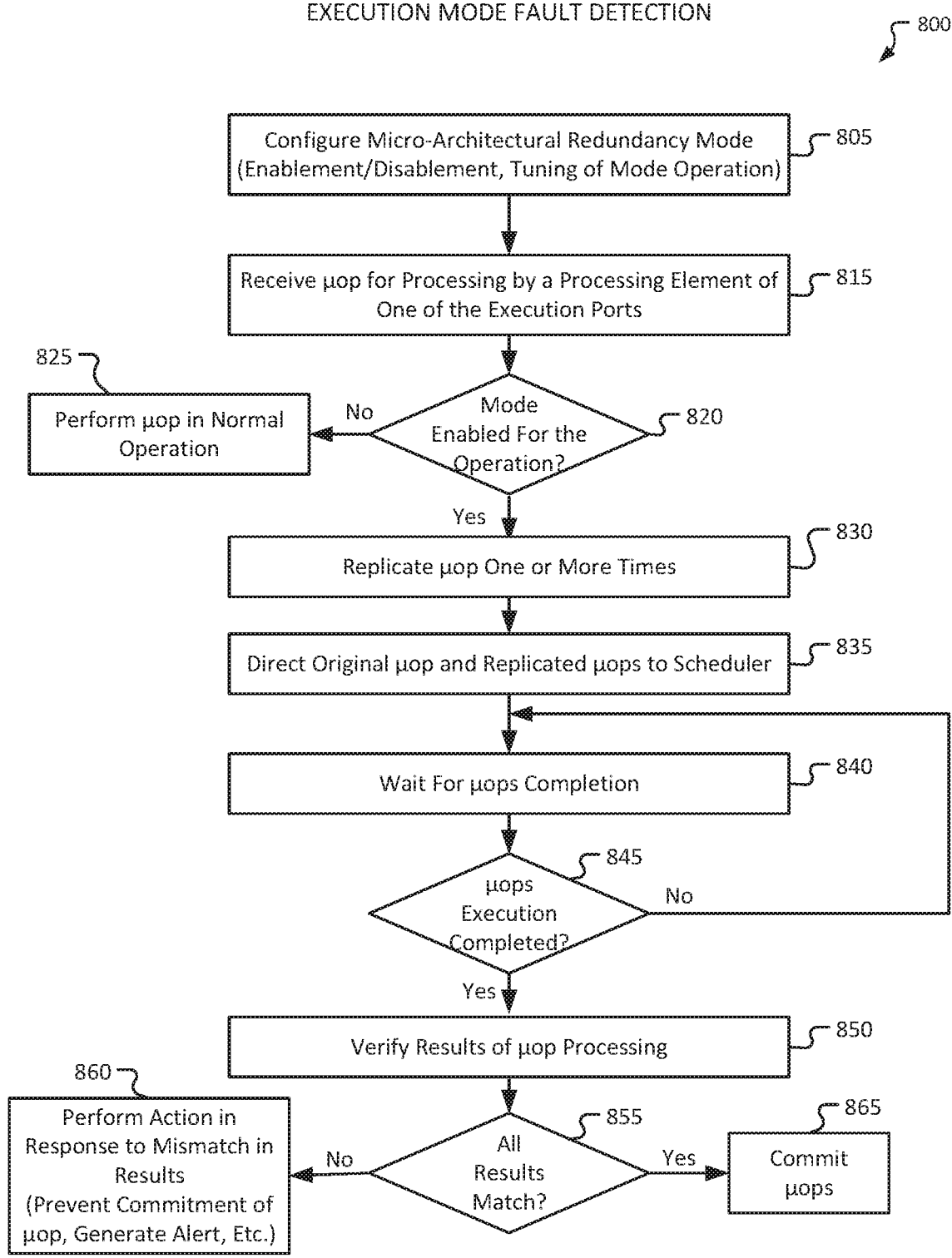
FIG. 8 is a flowchart to illustrate a process for a micro-architectural redundancy execution mode for detection of fault injection into a processor, according to some embodiments.

FIG. 8 is a flowchart to illustrate a process for a micro-architectural redundancy execution mode for detection of fault injection into a processor, according to some embodiments. In some embodiments, a micro-architectural redundancy execution mode may be configured for a particular processor or system 805, wherein a processor may, for example, include one or more execution ports, as illustrated in FIG. 6 and FIG. 7. Configuring the micro-architectural redundancy execution mode 805 may include enablement or disablement of the mode, or tuning operation of the mode for particular conditions.

The process may continue with processing of micro-operations for the processor 800. Upon receiving a micro-op for processing at a processing resource of one of the execution ports 815, there may be a determination whether the micro-architectural redundancy execution mode is currently enabled for the operation 820. Micro-ops may be scheduled for multiple execution ports in parallel, and thus the illustrated process may be performed for the scheduling of each relevant micro-op. Upon determining that the mode is not enabled, the micro-op is processed in a normal operation 825.

If it is determined that the micro-architectural redundancy execution mode is enabled for processor 820, then the micro-op is replicated one or more times 830. The original micro-op and the one or more replicated micro-ops are directed to a scheduler for scheduling of operation 835.

The process then waits for completion of processing of the micro-ops 840. Following completion of processing of the micro-op and one or more replicated micro-ops 845, the results of the processing of the micro-ops are verified 850. If the results for the processing of the micro-ops all match 855, then the original micro-op result may be committed 865. If the results do not all match, which may indicate detection of a fault, then an action may be taken in response to the mismatch in results 860. The action may, for example, preventing commitment of the micro-op during retirement, generation of a fault alert, or other security precautions.

Figure 9:
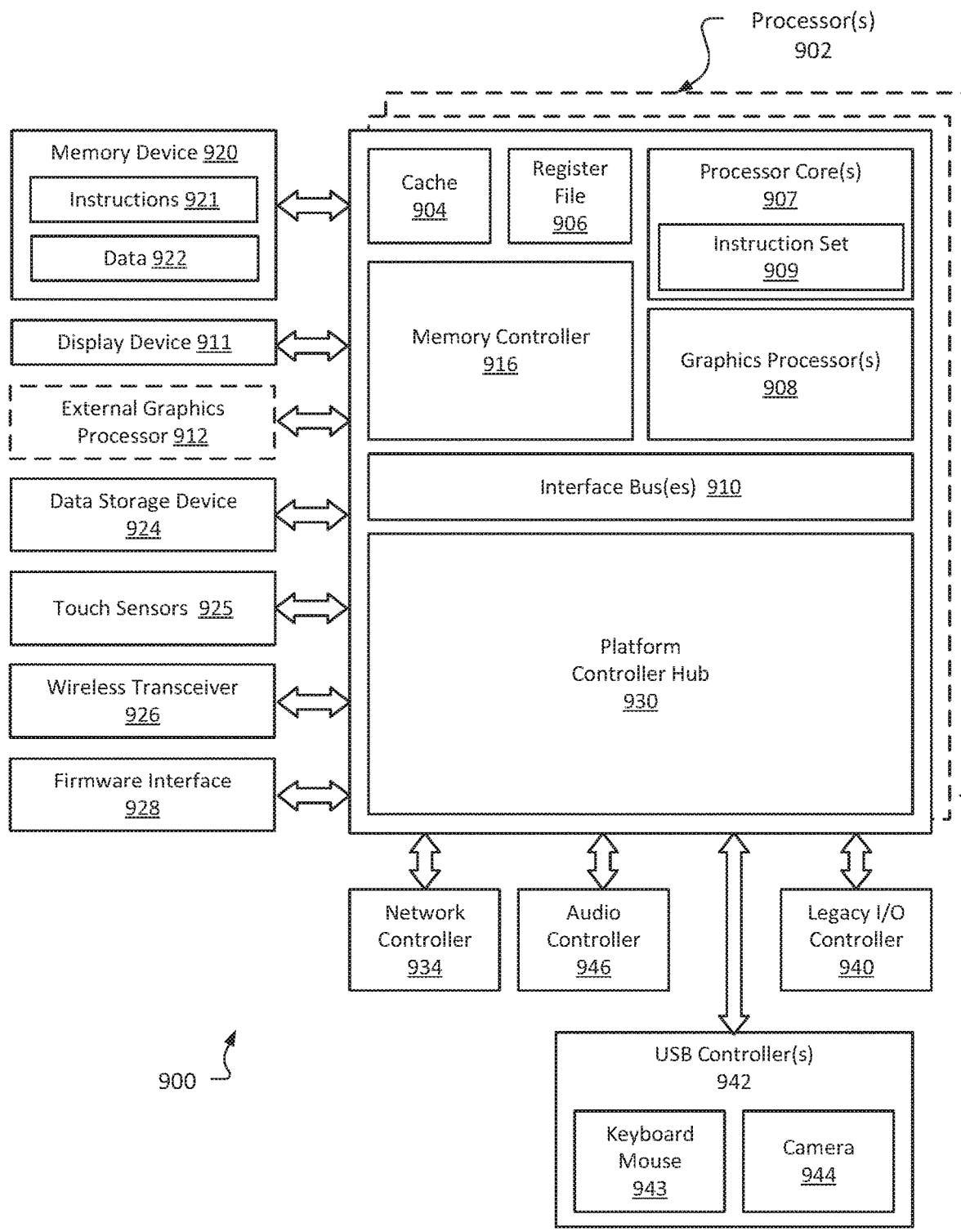
FIG. 9 illustrates an embodiment of an exemplary computing architecture for micro-architectural fault detection, according to some embodiments.

FIG. 9 illustrates an embodiment of an exemplary computing architecture for micro-architectural fault detection, according to some embodiments. In various embodiments as described above, a computing architecture 900 may comprise or be implemented as part of an electronic device. In some embodiments, the computing architecture 900 may be representative, for example, of a computer system that implements one or more components of the operating environments described above to provide micro-architectural fault detection utilizing one or both of an idle canary detection mode and a micro-architectural redundancy execution mode.

As used in this application, the terms "system" and "component" and "module" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900. In some embodiments, the computing elements are to provide for micro-architectural fault detection utilizing one or both of an idle canary detection mode and a micro-architectural redundancy execution mode.

As shown in FIG. 9, the computing architecture 900 includes one or more processors 902 and one or more graphics processors 908, and may be a single processor desktop system, a multiprocessor workstation system, or a server system having a large number of processors 902 or processor cores 907. In one embodiment, the system 900 is a processing platform incorporated within a system-on-a-chip (SoC or SOC) integrated circuit for use in mobile, handheld, or embedded devices.

An embodiment of system 900 can include, or be incorporated within, a server-based gaming platform, a game console, including a game and media console, a mobile gaming console, a handheld game console, or an online game console. In some embodiments system 900 is a mobile phone, smart phone, tablet computing device or mobile Internet device. Data processing system 900 can also include, couple with, or be integrated within a wearable device, such as a smart watch wearable device, smart eyewear device, augmented reality device, or virtual reality device. In some embodiments, data processing system 900 is a television or set top box device having one or more processors 902 and a graphical interface generated by one or more graphics processors 908.

In some embodiments, the one or more processors 902 each include one or more processor cores 907 to process instructions which, when executed, perform operations for system and user software. In some embodiments, each of the one or more processor cores 907 is configured to process a specific instruction set 909. In some embodiments, instruction set 909 may facilitate Complex Instruction Set Computing (CISC), Reduced Instruction Set Computing (RISC), or computing via a Very Long Instruction Word (VLIW). Multiple processor cores 907 may each process a different instruction set 909, which may include instructions to facilitate the emulation of other instruction sets. Processor core 907 may also include other processing devices, such a Digital Signal Processor (DSP).

In some embodiments, the processor 902 includes cache memory 904. Depending on the architecture, the processor 902 can have a single internal cache or multiple levels of internal cache. In some embodiments, the cache memory 904 is shared among various components of the processor 902. In some embodiments, the processor 902 also uses an external cache (e.g., a Level-3 (L3) cache or Last Level Cache (LLC)) (not shown), which may be shared among processor cores 907 using known cache coherency techniques. A register file 906 is additionally included in processor 902 which may include different types of registers for storing different types of data (e.g., integer registers, floating point registers, status registers, and an instruction pointer register). Some registers may be general-purpose registers, while other registers may be specific to the design of the processor 902.

In some embodiments, one or more processor(s) 902 are coupled with one or more interface bus(es) 910 to transmit communication signals such as address, data, or control signals between processor 902 and other components in the system. The interface bus 910, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 902 include an integrated memory controller 916 and a platform controller hub 930. The memory controller 916 facilitates communication between a memory device and other components of the system 900, while the platform controller hub (PCH) 930 provides connections to I/O devices via a local I/O bus.

Memory device 920 can be a dynamic random-access memory (DRAM) device, a static random-access memory (SRAM) device, flash memory device, phase-change memory device, or some other memory device having suitable performance to serve as process memory. In one embodiment the memory device 920 can operate as system memory for the system 900, to store data 922 and instructions 921 for use when the one or more processors 902 execute an application or process. Memory controller hub 916 also couples with an optional external graphics processor 912, which may communicate with the one or more graphics processors 908 in processors 902 to perform graphics and media operations. In some embodiments a display device 911 can connect to the processor(s) 902. The display device 911 can be one or more of an internal display device, as in a mobile electronic device or a laptop device, or an external display device attached via a display interface (e.g., DisplayPort, etc.). In one embodiment the display device 911 can be a head mounted display (HMD) such as a stereoscopic display device for use in virtual reality (VR) applications or augmented reality (AR) applications.

In some embodiments the platform controller hub 930 enables peripherals to connect to memory device 920 and processor 902 via a high-speed I/O bus. The I/O peripherals include, but are not limited to, an audio controller 946, a network controller 934, a firmware interface 928, a wireless transceiver 926, touch sensors 925, a data storage device 924 (e.g., hard disk drive, flash memory, etc.). The data storage device 924 can connect via a storage interface (e.g., SATA) or via a peripheral bus, such as a Peripheral Component Interconnect bus (e.g., PCI, PCI Express). The touch sensors 925 can include touch screen sensors, pressure sensors, or fingerprint sensors. The wireless transceiver 926 can be a Wi-Fi transceiver, a Bluetooth transceiver, or a mobile network transceiver such as a 3G, 4G, Long Term Evolution (LTE), or 5G transceiver. The firmware interface 928 enables communication with system firmware, and can be, for example, a unified extensible firmware interface (UEFI). The network controller 934 can enable a network connection to a wired network. In some embodiments, a high-performance network controller (not shown) couples with the interface bus 910. The audio controller 946, in one embodiment, is a multi-channel high definition audio controller. In one embodiment the system 900 includes an optional legacy I/O controller 940 for coupling legacy (e.g., Personal System 2 (PS/2)) devices to the system. The platform controller hub 930 can also connect to one or more Universal Serial Bus (USB) controllers 942 connect input devices, such as keyboard and mouse 943 combinations, a camera 944, or other USB input devices.

In some embodiments, one or more non-transitory computer-readable storage mediums having stored thereon executable computer program instructions that, when executed by one or more processors, cause the one or more processors to perform operations including receiving one or more micro instructions for scheduling in a processor, the processor including one or more processing resources; and performing fault detection in performance of the one or more micro instructions utilizing one or more of the following modes: a first idle canary detection mode, wherein the first mode includes assigning at least one component that is temporarily idle as a canary detector to perform a canary process with an expected outcome, and a second micro-architectural redundancy execution mode, wherein the second mode includes replicating a first micro instruction to generate a plurality of micro instructions for performance by a set of processing resources of the one or more processing resources.

In some embodiments, the at least one component is a processing resource of one or more execution ports.

In some embodiments, the first mode further includes verifying whether an actual result of the canary process performed by the at least one component matches the expected outcome for the canary process.

In some embodiments, the first mode further includes, upon determining that the actual result of the canary process does not match the expected outcome, taking one or more actions to address a possible fault.

In some embodiments, the one or more actions include providing a fault alert.

In some embodiments, the second mode further includes verifying results of the performance of the plurality of micro instructions to determine whether the results match.

In some embodiments, the second mode further includes, upon determining that the results of plurality of micro instructions do not all match each other, taking one or more actions to address a possible fault.

In some embodiments, the one or more actions include preventing the first micro instruction from committing.

In some embodiments, the first mode further includes utilizing one or more processing resources in performing at least a portion of functional safety (FUSA) testing for the processor.

In some embodiments, the one or more storage mediums further include instructions for tuning operation of one or both of the first mode and the second mode.

In some embodiments, a system includes a memory for storage of data, including data for processor instructions; and one or more processors including at least a first processor, the first processor including a micro instruction queue to provide queues for scheduling; a scheduler to schedule performance of micro instructions; and one or more processing resources to perform micro instructions, wherein the first processor is to provide one or more of a first idle canary detection mode, wherein the first mode includes assigning at least one component of the processor that is temporarily idle as an idle canary detector to perform a canary process with an expected outcome, and a second micro-architectural redundancy execution mode, wherein the second mode includes replicating a first micro instruction to generate a plurality of micro instructions for performance by a set of processing resources of the one or more processing resources.

In some embodiments, the first mode further includes verifying an actual result of the canary process performed by the at least one component against the expected outcome for the canary process; and upon determining that the actual result of the canary process does not match the expected outcome, taking one or more actions to address a possible fault.

In some embodiments, the canary process is tuned for fault detection including detection of a voltage fault or a timing fault that is applied to the first processor.

In some embodiments, the second mode further includes verifying results of the performance of the plurality of micro instructions to determine whether the results match; and upon determining that the results of plurality of micro instructions do not all match each other, taking one or more actions to address a possible fault.

In some embodiments, the system further includes a micro instruction replicator to receive micro instructions from the micro instruction queue and to replicate micro instructions for the second mode; and a replication micro instruction verifier to verify the results of the performance of replicated micro instructions.

In some embodiments, the one or more processors are to tune operation of one or both of the first mode and the second mode.

In some embodiments, performing micro-architectural fault detection includes detection of a voltage fault or a timing fault that is applied to the processor.

In some embodiments, a method includes receiving one or more micro instructions for scheduling in a processor, the processor including one or more processing resources; and determining whether a mode for micro-architectural fault detection are enabled for micro instruction processing, the modes being either a first idle canary detection mode including assigning at least one component of the processor that is temporarily idle as an idle canary detector to perform a canary process with an expected outcome, and a second micro-architectural redundancy execution mode including replicating a first micro instruction to generate a plurality of micro instructions for performance by a set of processing resources of the one or more processing resources; and upon determining that the mode for micro-architectural fault detection is enabled, processing of the one or more micro instructions utilizing the enabled mode.

In some embodiments, the first mode further includes verifying an actual result of the canary process performed by the at least one component against the expected outcome for the canary process; and upon determining that the actual result of the canary process does not match the expected outcome, taking one or more actions to address a possible fault.

In some embodiments, the second mode further includes verifying results of the performance of the plurality of micro instructions to determine whether the results match; and upon determining that the results of plurality of micro instructions do not all match each other, taking one or more actions to address a possible fault.

In some embodiments, the method further includes tuning either or both of the first mode and the second mode, wherein tuning includes selecting conditions in which either the first mode or the second mode will operate.

In some embodiments, an apparatus includes means for receiving one or more micro instructions for scheduling in a processor, the processor including one or more processing resources; and means for performing fault detection in performance of the one or more micro instructions utilizing one or more of the following modes: a first idle canary detection mode, wherein the first mode includes assigning at least one component that is temporarily idle as an idle canary detector to perform a canary process with an expected outcome, and a second micro-architectural redundancy execution mode, wherein the second mode includes replicating a first micro instruction to generate a plurality of micro instructions for performance by a set of processing resources of the one or more processing resources.

In some embodiments, the at least one component is a processing resource of one or more execution ports.

In some embodiments, the first mode further includes verifying whether an actual result of the canary process performed by the at least one component matches the expected outcome for the canary process.

In some embodiments, the first mode further includes, upon determining that the actual result of the canary process does not match the expected outcome, taking one or more actions to address a possible fault.

In some embodiments, the one or more actions include providing a fault alert.

In some embodiments, the second mode further includes verifying results of the performance of the plurality of micro instructions to determine whether the results match.

In some embodiments, the second mode further includes, upon determining that the results of plurality of micro instructions do not all match each other, taking one or more actions to address a possible fault.

In some embodiments, the one or more actions include preventing the first micro instruction from committing.

In some embodiments, the first mode further includes utilizing one or more processing resources in performing at least a portion of functional safety (FUSA) testing for the processor.

In some embodiments, the apparatus further includes means for tuning operation of one or both of the first mode and the second mode.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. One or more non-transitory computer-readable storage mediums having stored thereon executable computer program instructions that, when executed by one or more processors, cause the one or more processors to perform operations comprising:
    receiving one or more micro instructions for scheduling in a processor, the processor including one or more processing resources;
    performing fault detection in performance of the one or more micro instructions utilizing one or more of the following modes:
        a first idle canary detection mode, wherein the first mode includes:
            assigning at least one component of the processor that is temporarily idle as an idle canary detector to perform a canary process, the canary process being a predefined operation having an expected outcome, and verifying whether an actual result of the canary process performed by the at least one component matches the expected outcome for the canary process, and a second micro-architectural redundancy execution mode, wherein the second mode includes:

replicating a first micro instruction to generate a plurality of micro instructions for performance by a set of processing resources of the one or more processing resources, and verifying results of the performance of the plurality of micro instructions to determine whether the results generated by each of the set of processing resources match with each other; and tuning operation of one or both of the first mode and the second mode, wherein tuning includes selecting conditions in which either the first mode or the second mode will operate.

2. The one or more storage mediums of claim 1, wherein the at least one component is a processing resource of one or more execution ports.

3. The one or more storage mediums of claim 1, wherein the first mode further includes:

upon determining that the actual result of the canary process does not match the expected outcome, taking one or more actions to address a possible fault that is indicated by mismatch of the actual result and the expected outcome.

4. The one or more storage mediums of claim 3, wherein the one or more actions include providing a fault alert.

5. The one or more storage mediums of claim 1, wherein the second mode further includes:

upon determining that the results of plurality of micro instructions do not all match each other, taking one or more actions to address a possible fault that is indicated by mismatch of the results with each other.

6. The one or more storage mediums of claim 5, wherein the one or more actions include preventing the first micro instruction from committing.

7. The one or more storage mediums of claim 1, wherein the first mode further includes utilising one or more processing resources in performing at least a portion of functional safety (FUSA) testing for the processor.

8. The one or more storage mediums of claim 1, wherein the first mode further includes:

assigning the canary process in advance for the one or more micro instructions.

9. The one or more storage mediums of claim 1, wherein the first mode further includes:

determining a thermal status for a plurality of components of the processor; and selecting the at least one component of the processor for the canary process based at least in part on the component being thermally available under current operating conditions.

10. The one or more storage mediums of claim 1, wherein the tuning operation for the first mode includes evaluating a plurality of available canary processes and identifying processing resources that can be protected by each of the plurality of available canary processes.

11. The one or more storage mediums of claim 10, wherein the tuning operation for the first mode further includes determining an expected power consumption to be caused by each of the plurality of available canary processes.

12. A system comprising:

a memory for storage of data, including data for processor instructions; and one or more processors including at least a first processor, the first processor including:

a micro instruction queue to provide queues for scheduling;

a scheduler to schedule performance of micro instructions; and one or more processing resources to perform micro instructions;

wherein the first processor is to provide one or more of:

a first idle canary detection mode, wherein the first mode includes:

assigning at least one component of the processor that is temporarily idle as an idle canary detector to perform a canary process, the canary process being a predefined operation having an expected outcome, and verifying whether an actual result of the canary process performed by the at least one component matches the expected outcome for the canary process, and a second micro-architectural redundancy execution mode, wherein the second mode includes:

replicating a first micro instruction to generate a plurality of micro instructions for performance by a set of processing elements of the one or more processing resources, and verifying results of the performance of the plurality of micro instructions to determine whether the results generated by each of the set of processing resources match with each other; and wherein the one or more processors are to:

tune operation of one or both of the first mode and the second mode, wherein tuning includes selecting conditions in which either the first mode or the second mode will operate.

13. The system of claim 12, wherein the first mode further includes:

upon determining that the actual result of the canary process does not match the expected outcome, taking one or more actions to address a possible fault that is indicated by mismatch of the actual result and the expected outcome.

14. The system of claim 13, wherein the canary process is tuned for fault detection including detection of a voltage fault or a timing fault that is applied to the first processor.

15. The system of claim 12, wherein the second mode further includes:

upon determining that the results of plurality of micro instructions do not all match each other, taking one or more actions to address a possible fault that is indicated by mismatch of the results with each other.

16. The system of claim 12, further comprising:

a micro instruction replicator to receive micro instructions from the micro instruction queue and to replicate micro instructions for the second mode; and a replication micro instruction verifier to verify the results of the performance of replicated micro instructions.

17. A method comprising:

receiving one or more micro instructions for scheduling in a processor, the processor including one or more processing resources;

determining whether a mode for micro-architectural fault detection is enabled for micro instruction processing, the mode being either:

a first idle canary detection mode including:

assigning at least one component of the processor that is temporarily idle as an idle canary detector to perform a canary process, the canary process being a predefined operation having an expected outcome, and verifying whether an actual result of the canary process performed by the at least one component matches the expected outcome for the canary process, and a second micro-architectural redundancy execution mode including:

replicating a first micro instruction to generate a plurality of micro instructions for performance by a set of processing resources of the one or more processing resources, and verifying results of the performance of the plurality of micro instructions to determine whether the results generated by each of the set of processing resources match with each other;

upon determining that the mode for micro-architectural fault detection is enabled, processing of the one or more micro instructions utilising the enabled mode; and tuning either or both of the first mode and the second mode, wherein tuning includes selecting conditions in which either the first mode or the second mode will operate.

18. The method of claim 17, wherein the first mode further includes:

upon determining that the actual result of the canary process does not match the expected outcome, taking one or more actions to address a possible fault that is indicated by mismatch of the actual result and the expected outcome.

19. The method of claim 17, wherein the second mode further includes:

upon determining that the results of plurality of micro instructions do not all match each other, taking one or more actions to address a possible fault that is indicated by mismatch of the results with each other.

* * * * *